(12) United States Patent
Li et al.

(10) Patent No.: US 9,124,166 B2
(45) Date of Patent: Sep. 1, 2015

(54) ELECTRIC MOTOR

(75) Inventors: Yue Li, Hong Kong (CN); Li Sheng Liu, Shenzhen (CN)

(73) Assignee: Johnson Electric S.A., Murten (CH)

( * ) Notice: Subject to any disclaimer, the term of this patent is extended or adjusted under 35 U.S.C. 154(b) by 374 days.

(21) Appl. No.: 13/441,429

(22) Filed: Apr. 6, 2012

(65) Prior Publication Data

US 2012/0256507 A1  Oct. 11, 2012

(30) Foreign Application Priority Data

Apr. 7, 2011  (CN) .......................... 2011 1 0090016

(51) Int. Cl.
| | |
|---|---|
| *H02K 13/04* | (2006.01) |
| *H02K 23/62* | (2006.01) |
| *H02K 13/00* | (2006.01) |
| *H02K 13/10* | (2006.01) |

(52) U.S. Cl.
CPC .............. *H02K 23/62* (2013.01); *H02K 13/006* (2013.01); *H02K 13/04* (2013.01); *H02K 13/105* (2013.01)

(58) Field of Classification Search
CPC ..... H02K 13/04; H02K 13/105; H02K 23/62; H01R 39/04; H01R 39/08
USPC .................................. 310/219, 220, 232, 233
IPC ....................................................... H02K 13/10
See application file for complete search history.

(56) References Cited

U.S. PATENT DOCUMENTS

| | | | | |
|---|---|---|---|---|
| 4,704,552 | A * | 11/1987 | Masterman | 310/148 |
| 4,949,023 | A | 8/1990 | Shlien | |
| 5,742,111 | A * | 4/1998 | Reed | 310/236 |
| 6,396,175 | B2 | 5/2002 | Fujita et al. | |
| 7,119,468 | B2 * | 10/2006 | Shkondin | 310/114 |
| 2003/0052566 | A1 * | 3/2003 | Kuenzel et al. | 310/236 |
| 2003/0090165 | A1 | 5/2003 | Ettridge | |
| 2006/0043817 | A1 * | 3/2006 | Nagai et al. | 310/219 |

FOREIGN PATENT DOCUMENTS

| | | | |
|---|---|---|---|
| FR | 2814868 A1 * | 4/2002 | |
| JP | 47001606 U | 8/1972 | |
| JP | 54090506 A * | 7/1979 | |
| JP | 55125054 A * | 9/1980 | |
| JP | 4200259 A | 7/1992 | |
| JP | 2006074906 A * | 3/2006 | |

OTHER PUBLICATIONS

Machine Translation, Oketani et al., JP 2006074906 A, Mar. 16, 2006.*
Machine Translation, Collin et al., FR 2814868 A1, Apr. 5, 2002.*
(Continued)

*Primary Examiner* — Thomas Truong
(74) *Attorney, Agent, or Firm* — Muncy, Geissler, Olds & Lowe, P.C.

(57) ABSTRACT

A brush direct current motor has a stator with a plurality of coils that correspond to N phases, a rotor with 2P magnet poles and a current converting device for converting direct current power to N phases current and carrying the N phases of alternating current for the coils of the stator. The current converting device has a plurality of first and second bars alternately arranged with transiting plates along a brush path. Resistors connect the transiting plates to one of the adjacent bars.

11 Claims, 5 Drawing Sheets

(56) References Cited

OTHER PUBLICATIONS

USPTO Translation, Yamada et al., JP 54090506 A, Commutator of DC Motor.*

USPTO Translation, Kamimoto et al., JP 55125054 A, Sep. 26, 1980.*

* cited by examiner

ELECTRIC MOTOR

CROSS REFERENCE TO RELATED APPLICATIONS

This non-provisional patent application claims priority under 35 U.S.C. §119(a) from Patent Application No. 201110090016.2 filed in The People's Republic of China on Apr. 7, 2011.

FIELD OF THE INVENTION

This invention relates to electric motors and, particularly, to a direct current motor having a commutator and a permanent magnet rotor.

BACKGROUND OF THE INVENTION

Direct current electric motors having a permanent magnet rotor, wound stator coils, a commutator and brushes are generally known as shown in Japanese patent publication JP4-200259. The commutator is used to convert the direct current power to alternating current power in a number of phases to supply the stator coils. Suppression of electrical noise is an important issue for such motors as the power of the motor is increased. Usually noise suppression elements, such as capacitors and chokes, are connected between the brush and the power source. The size of the chokes is often large to achieve acceptable suppression which increases the size of the motor.

The present invention aims to provide a new motor which can solve or at least mitigate the above mentioned problems.

SUMMARY OF THE INVENTION

Accordingly, in one aspect thereof, the present invention provides a brush direct motor, comprising: a stator comprising a plurality of coils that correspond to N phases; a rotor comprising a shaft and 2P radially polarized permanent magnetic poles; a commutator fixed to the shaft, comprising: a first conductive ring; a second conductive ring spaced from the first conductive ring; a plurality of first bars extending from the first conductive ring; a plurality of second bars extending from the second conductive ring; a plurality of transiting plates; a body supporting the first conductive ring, second conductive ring first bars, second bars and the transiting plates; and a plurality of resistors, wherein the first and second bars are alternately arranged along a brush path, at least one of the transiting plates is disposed between each of the first bars and the second bars, and one of the resistors is respectively connected between each of the transiting plates and one of the adjacent first and second bars; two first brushes respectively arranged to make sliding electrical connected to the first and second conductive rings; and a plurality of second brushes arranged to make sliding electrical contact with the first bars, second bars and transiting plates and electrically connected to the N phases.

Preferably, there are two transiting plates disposed between each of the first bars and second bars, each of the two transiting plates being connected to its adjacent first or second bar through a respective one of the resistors.

Preferably, the commutator further comprises a plurality of capacitors and each capacitor is respectively connected across each of the resistors.

Preferably, the commutator has a cylindrical brush contact surface formed by the first and second conductive rings and the first and second bars extending in the axial direction of the shaft.

Preferably, the commutator has a planar brush contact surface formed by the first and second conductive rings and the first and second bars extending in the radial direction of the shaft.

Preferably, the stator further comprises a circular yoke and a number of teeth protruding from the inner surface of the yoke, adjacent teeth defining a slot; and wherein the number of slots S=k*N*2P, where k, N, and P are any integer greater than 1.

Preferably, in the circumferential direction of the shaft, the width of the first or second bar is substantially equal to the arc length that corresponds to the conducting angle of the phase less the sum of the width of the second brush and a spacing width.

Preferably, the spacing width is between 0.1 to 2 millimeters.

According to a second aspect thereof, the present invention provides a commutator, comprising: a first conductive ring; a second conductive ring spaced from the first conductive ring; a plurality of first bars extending from the first conductive ring; a plurality of second bars extending from the second conductive ring; a plurality of transiting plates; a body adapted to be fixed to a shaft and supporting the first conductive ring, second conductive ring first bars, second bars and the transiting plates; and a plurality of resistors, wherein the first and second bars are alternately arranged along a brush path, at least one of the transiting plates is disposed between each of the first bars and the second bars, and one of the resistors is respectively connected between each of the transiting plates and one of the adjacent first and second bars.

Preferably, there are two transiting plates disposed between each of the first bars and second bars, each of the two transiting plates being connected to its adjacent first or second bar through a respective one of the resistors.

Preferably, capacitors are respectively connected across the resistors.

Preferably, the commutator has a cylindrical brush contact surface formed by the first and second conductive rings and the first and second bars extending in the axial direction of the shaft.

Preferably, the commutator has a planar brush contact surface formed by the first and second conductive rings and the first and second bars extending in the radial direction of the shaft.

In embodiments of the present invention, as a transiting plate is connected to the bar via a resistor, a voltage drop exists between the bar and the transiting plate. Thus, the change in the current of the second brush when it slides from the bar to the transiting plate and further to the adjacent bar will be a relatively gentle. In this way, no intense current pulses is generated and therefore sparks are restrained at the moment when the brush disconnects the bar.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
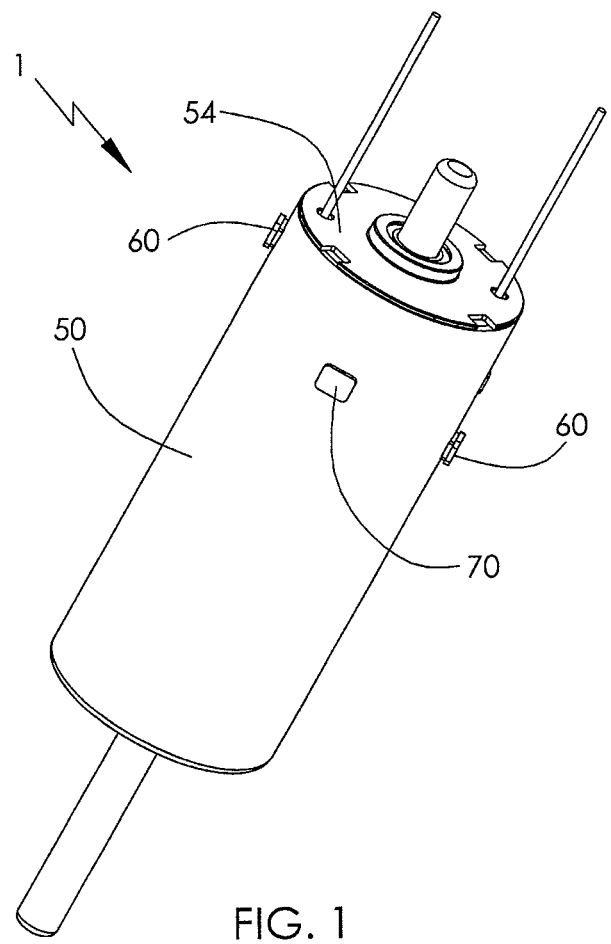
FIG. 1 is a perspective view of a brush direct current motor, according to an embodiment of the present invention, which includes a commutator and a number of coils corresponding to three phases.
Figure 3:
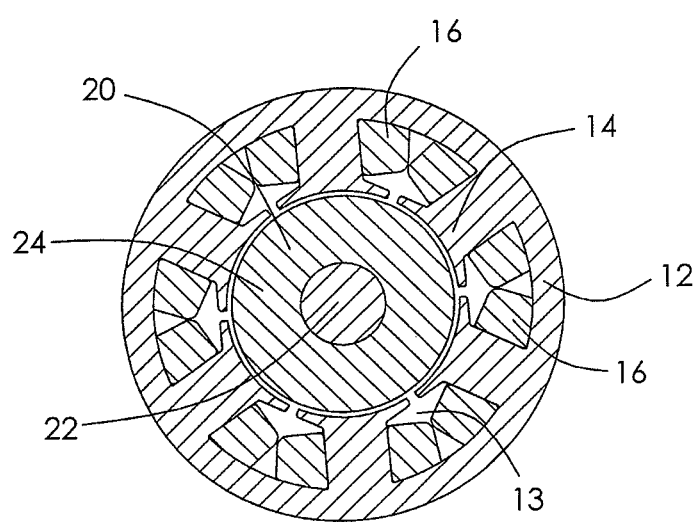
FIG. 3 is a sectional view of the motor of FIG. 1.
Figure 2:
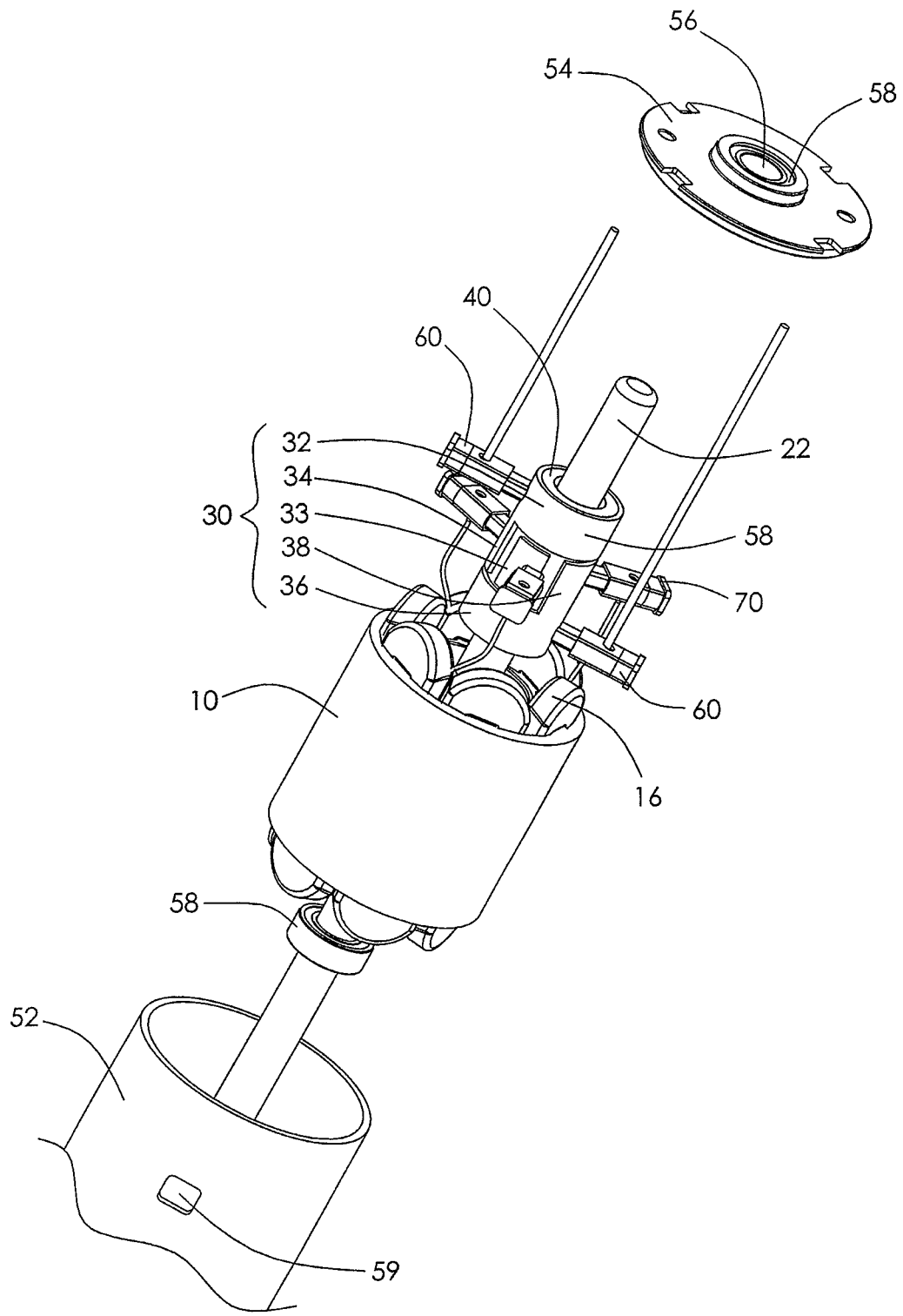
FIG. 2 is an partial exploded view of the motor of FIG. 1.
Figure 4:
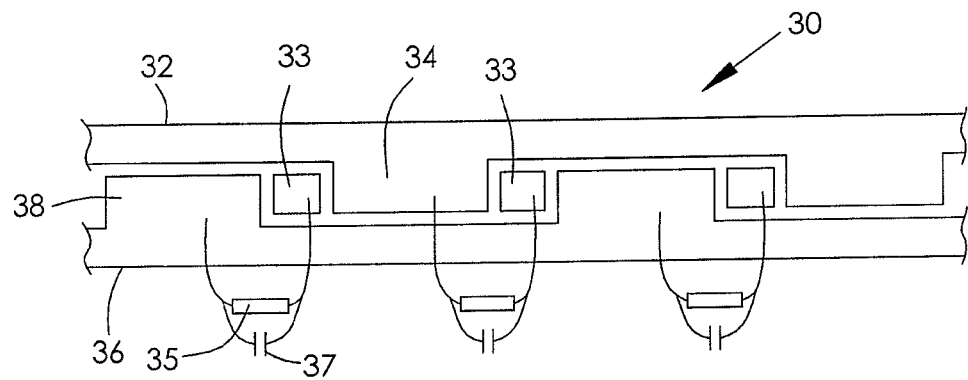
FIG. 4 is a schematic unfolded plane view of the commutator of FIG. 1.

Referring to FIGS. 1 to 4, a brush direct current motor 1, according to the an embodiment of the present invention, includes a stator 10, a rotor 20, a commutator 30, a casing 50, a number of first brushes 60, and a number of second brushes 70.

The stator 10 includes a circular yoke 12, a number of teeth 14, and a number of coils 16. The teeth 14 protrude from the inner surface of the yoke 12, so as to define a number of slots 13. The coils 16 correspond to N phases and are wound around corresponding teeth 14. In the present embodiment, the coil 16 is made of aluminum, the coils 16 correspond to three phases, the stator 10 has six teeth 14, and there are three second brushes 70. The coils 16 may be connected in star, which means one end of each coil is connected to a respect second brush 70 while the other end of each coil are connected together. Alternatively, the coils may be connected in delta, which means each coil is connected between two of the second brushes 70.

The rotor 20 is arranged inside the stator 10, including a shaft 22 and a number of permanent magnets 24 that are fixed to the shaft 22, typically via a rotor core, and are radially polarized. In the present embodiment, four magnets 24 are equidistantly fixed to the shaft 22, the polarity of each magnetic pole 24 is different from that of the two adjacent magnetic poles 24. Preferably, the magnets of the rotor are formed by a single ring magnet having a number of poles of alternating polarity spaced circumferentially about the rotor. As such, the rotor has 2P permanent magnetic poles.

The commutator 30 is fixed to the shaft 22 and has an insulating body supporting a number of commutator elements, including a first circular conductive ring 32, a number of first bars 34, a second circular conductive ring 36, a number of second bars 38, a number of transiting plates 33 and a number of resistors 35. The first and second conductive rings 32 and 36 are spaced along the shaft 22. The first bars 34 extend axially from the first conductive ring 32, towards the second conductive ring 36. Preferably, the first bars are integrally formed with the first ring as a single piece stamping. The second bars 38 extend axially from the second conductive ring 36, towards the first conductive ring 32. Preferably, the second bars are integrally formed with the second ring as a single piece stamping. The first and second bars 34 and 38 are alternately arranged at equally spaced intervals in the circumferential direction of the shaft 22. The transiting plates 33 are respectively disposed between the first bars 34 and the second bars 38. The first bars 34, second bars 38, and the transiting plates 33 are electrically insulated from each other. Each resistor 35 is electrically connected to one of the transiting plates 33 and to an adjacent first or second bar 34, 38.

Referring back to FIG. 2, the casing 50 includes a substantially cup-shaped main body 52 and a cover 54 for closing the open end of the main body 52. The bottom end of the main body 52 has a first hole (not shown), while the cover 54 has a second hole 56. The core of the stator 10 is tightly fitted to an inner peripheral surface of the main body 52, with the shaft 22 of the rotor 20 running through the first and second holes via bearings 58 mounted in the bottom end and cover. The main body 52 also defines a number of fixing holes 59. Each brush is slidably received in a brush cage. The brush cages of the two first brushes 60 are fixedly received in the fixing holes 59 so as to extend in the radial direction of the shaft 22 to make sliding contact with the first and second conductive rings 32, 36 respectively. The brush cages for the second brushes 70 are located axially between the two first brushes and fixed in corresponding fixing holes 59 equally spaced circumferentially about the casing. The second brushes are arranged to make sliding contact with the first bars 34, the second bars 38, and the transiting plates 33, as the rotor turns.

The width of the first and second bars 34, 38, measured in the circumferential direction of the shaft 22, is almost equal to the arc length that corresponds to the conducting angle of the phase, less the sum of the width of a second brush 70 and a spacing width, preferably between 0.1 to 2 millimeters, for avoiding power short circuits. The conducting angle of the phase may be 180 or 120 degrees. The distance between the first bar 34 and the adjacent second bar 38 is greater than the width of the second brush 70. The width of the transiting plate 33 is greater than that of the second brush 70. The distance between the transiting plate 33 and the first or second bar 34, 38 is less than the width of the second brush 70.

Figure 5A:
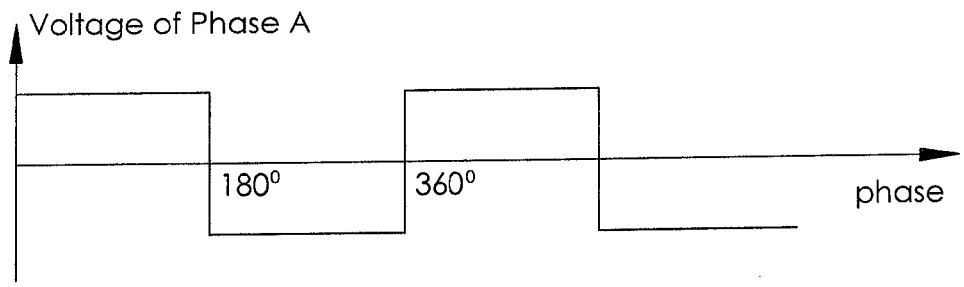
FIGS. 5A to 5C show the phases of voltages added to the windings of the motor of FIG. 1.
Figure 5B:
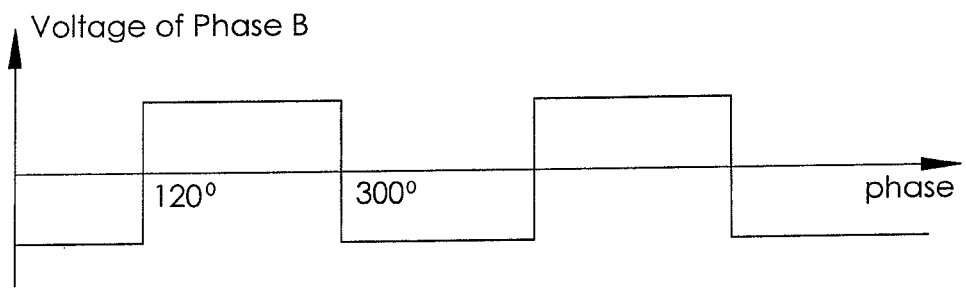
Figure 5C:
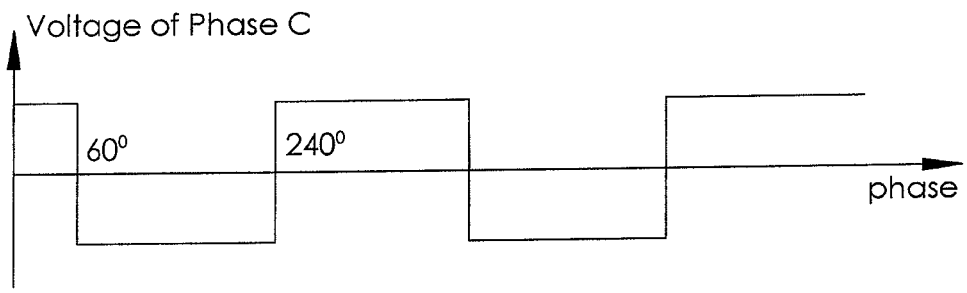

In operation, direct current power is transmitted to the coils 16 via the first brushes 60, the commutator 30, and the second brushes 70, in series from a direct power source (not shown), so that the coils 16 generate magnetic fields. The force created by these magnetic fields, causes the rotor 20 to rotate. During rotation, the direct current power is converted by the commutator 60 into N phases of alternating current power which is supplied to the coils 16, as shown in FIGS. 5A to 5C, so as to maintain the rotation of the rotor 20. As the transiting plates 33 are connected to the first or second bars 34, 38 via the resistors 35, a voltage drop exists between the bar 34, 38 and the transiting plate 81, which leads to a relatively gentle change in the current of the second brush 70 when it slides from the bar 34, 38 to the transiting plate 81 and further to the adjacent bar 34, 38. In this way, no intense current pulses are generated and therefore sparks are restrained or reduced at the moment when the brush disconnects from the bar 34, 38.

Referring back to FIG. 4, in an alternative embodiment, a capacitor 37 is connected in parallel across each resistor 35 to help dissipate any alternating current that may be induced during commutation.

Figure 6:
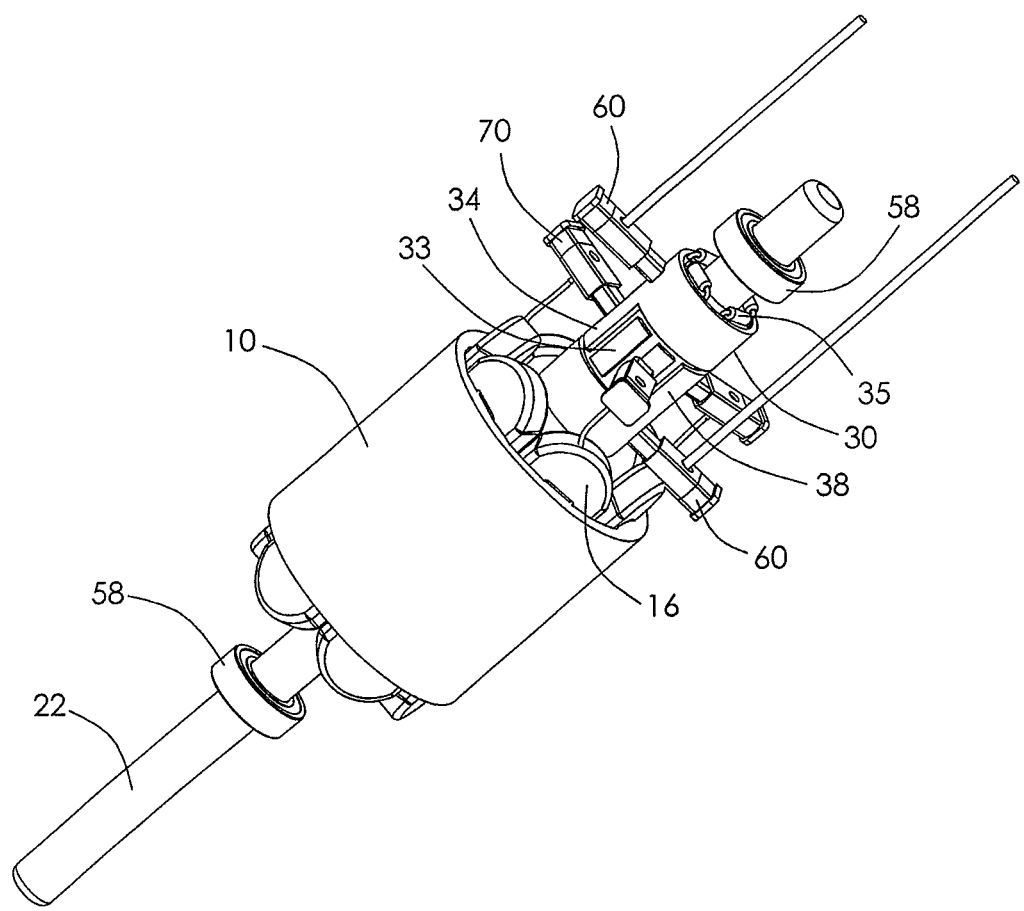
FIG. 6 is a perspective view of a brush direct motor without a casing, according to another embodiment of the present invention, which also includes a commutator.
Figure 7:
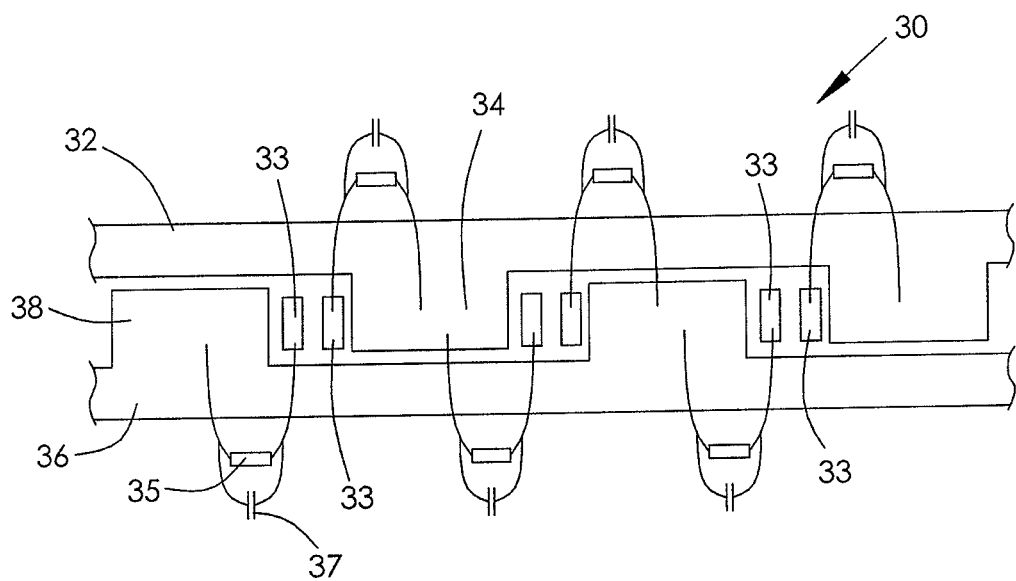
FIG. 7 is a schematic unfolded plane view of the commutator of FIG. 6.

A further embodiment is shown in FIGS. 6 and 7, in which two transiting plates 33 are disposed between adjacent first and second bars 34, 38. Each transiting plate 33 is connected to the adjacent bar 34, 38 via a resistor 35 or a resistor 35 and a capacitor 37 connected in parallel. As such, in operation, the change in the current of the second brush 70 will be gentler than the above-mentioned embodiment. Therefore, current pulses will be even lower and the sparks will be more effectively restrained. This embodiment is also suitable for motors which are to be operated in both directions.

The first and second conductive rings 32 and 36, the first and second bars 34 and 38, and the first and second brushes 60 and 70 are used as a current converting device (not labeled) for converting the current supplied from a direct current power source to N phases of alternating current in cooperation with the rotation of the rotor, and passing the N phase currents to the coils 16 of the stator 10. However, it should be understood that the commutator is not limited to the present embodiment.

Figure 8:
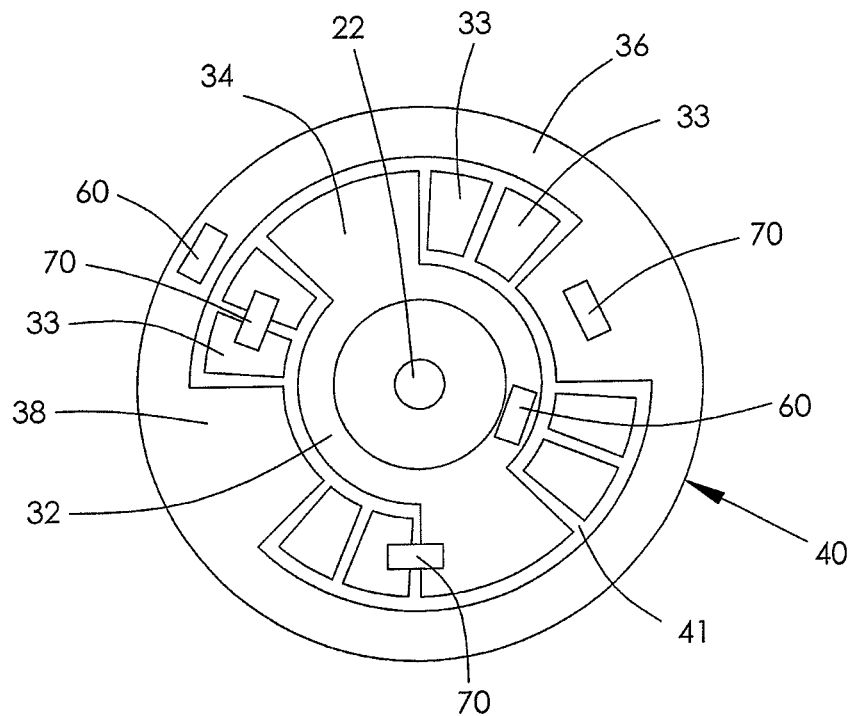
FIG. 8 is a plane view of a commutator, according to another embodiment of the present invention.

For example, in another embodiment, as shown in FIG. 8, the commutator may have a planar contact surface. The first bars 34 extend radially, outwardly from the first conductive ring 32 that is fixed to the shaft 22 via an insulating body 40. The second conductive ring 36 is arranged at the radially outer edge of the body 40. The body 40 supports the commutator elements, namely the first conductive ring 32, the first bars 34, the transiting plates 33, the second conductive ring 36 and the second bars 38. The second bars 38 extend radially inwardly from the inner edge of the second conductive ring 36. The first and second bars 34, 38 are alternately arranged at equal intervals in the circumferential direction of the shaft 22. The transiting plates 33 are separately arranged between adjacent first and second bars 44, 48, while each transiting plate 33 is connected to the adjacent bar 34, 38 via a resistor (not shown). The gap 41 between the conductive rings 32, 36, the bars 34, 38, and the transiting plates 33 can be filled with insulating material such as thermosetting plastic. In this case, the first and second brushes 60 and 70 extend in the axial direction of the shaft 22 and are radially spaced from the shaft to connect to respective conductive rings 32, 36, or to the bars 34, 38 and transiting plates 33.

In the present embodiments, 3 phases, 4 magnet poles and 6 slots 13 are provided. However, it should be understood that the number of phases N, the number of magnet poles 2P, and the number of slots S are not limited to 3, 4, and 6 respectively. It was found that when S=k*N*2P, where k, N, and P are any integer greater than 1, the efficiency of the motor 1 is relatively high. Further, when the number of phases N is two, the number of second brushes 70 should be 2N. When N is equal to three or more, the number of second brushes 70 should be not less than N.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A brush direct motor, comprising:
a stator comprising a plurality of coils that correspond to N phases;
a rotor comprising a shaft and 2P radially polarized permanent magnetic poles;
a commutator fixed to the shaft, comprising: a first conductive ring; a second conductive ring spaced from the first conductive ring; a plurality of first bars extending from the first conductive ring; a plurality of second bars extending from the second conductive ring; a plurality of transiting plates; a body supporting the first conductive ring, second conductive ring, first bars, second bars and the transiting plates; and a plurality of resistors, wherein the first and second bars are alternately arranged along a brush path, at least one of the transiting plates is disposed between each of the first bars and the second bars, and one of the resistors is respectively connected between each of the transiting plates and one of the adjacent first and second bars;
two first brushes respectively arranged to make sliding electrical connected to the first and second conductive rings; and
a plurality of second brushes arranged to make sliding electrical contact with the first bars, second bars and transiting plates and electrically connected to the N phases, wherein when one of the second brushes leaves one of the first and second bars to contact with a corresponding transiting plate, a corresponding phase of coils is connected to said one of the first and second bars via said one of the second brushes, the corresponding transiting plate and a corresponding resistor which is connected between said one of the first and second bars and the corresponding transiting plate, and power is transmitted to the corresponding phase of coils via a corresponding first brush, said one of the first and second bars, the corresponding resistor, the corresponding transiting plate and said one of the second brushes in series from a direct power source.

2. The motor of claim 1, wherein there are two transiting plates disposed between each of the first bars and second bars, each of the two transiting plates being connected to its adjacent first or second bar through a respective one of the resistors.

3. The motor of claim 1, wherein the commutator further comprises a plurality of capacitors and each capacitor is respectively connected across each of the resistors.

4. The motor of claim 1, wherein the commutator has a cylindrical brush contact surface formed by the first and second conductive rings and the first and second bars extending in an axial direction of the shaft.

5. The motor of claim 1, wherein the commutator has a planar brush contact surface formed by the first and second conductive rings and the first and second bars extending in a radial direction of the shaft.

6. The motor of claim 1, wherein the stator further comprises a circular yoke and a number of teeth protruding from an inner surface of the yoke, adjacent teeth defining a slot; and wherein number of slots S=k*N*2P, where k, N, and P are any integer greater than 1.

7. The motor of claim 1, wherein a width of the transiting plate is greater than that of the second brush.

8. A brush direct current motor, comprising:
a stator comprising a plurality of coils that correspond to N phases;
a rotor received in the stator and comprising 2P radially polarized magnet poles;
a current converting device for commutating the direct current supplied from a direct current power source to N phases of alternating current and connecting the N phases currents to respective coils of the stator, the current converting device comprising a plurality of bars connected to a positive or negative power source;
a plurality of first transiting plates respectively arranged between two adjacent bars, and
a plurality of resistors respectively connected to the first transiting plates and one of the adjacent bars,
N brushes including first and second brushes, wherein said second brushes are arranged to make sliding electrical contact with the bars and transiting plates, electrically connected to the N phases,
wherein when one of the second brushes leaves one of the bars to contact with one of the transiting plates, a corresponding phase of coils is connected to said one of the bars via said one of the brushes, the one transiting plate and one of the plurality of resistors which is connected between said one of the bars and the one transiting plate, and power is transmitted to the corresponding phase of coils via the one of the second brushes, said one of the bars, the one resistor, the one transiting plate and one of the first brushes in series from the direct power source.

9. The motor of claim 8 further comprising a plurality of second transiting plates, wherein the first and second transiting plates are separately arranged between adjacent first and second bars, each first and second transiting plate is connected to its adjacent bar through a respective one of the resistors.

10. The motor of claim 8, wherein the commutator further comprises a plurality of capacitors and each capacitor is respectively connected across each of the resistors.

11. The motor of claim 8, wherein a width of the first transiting plate is greater than that of the brush.

* * * * *